Figure 1:
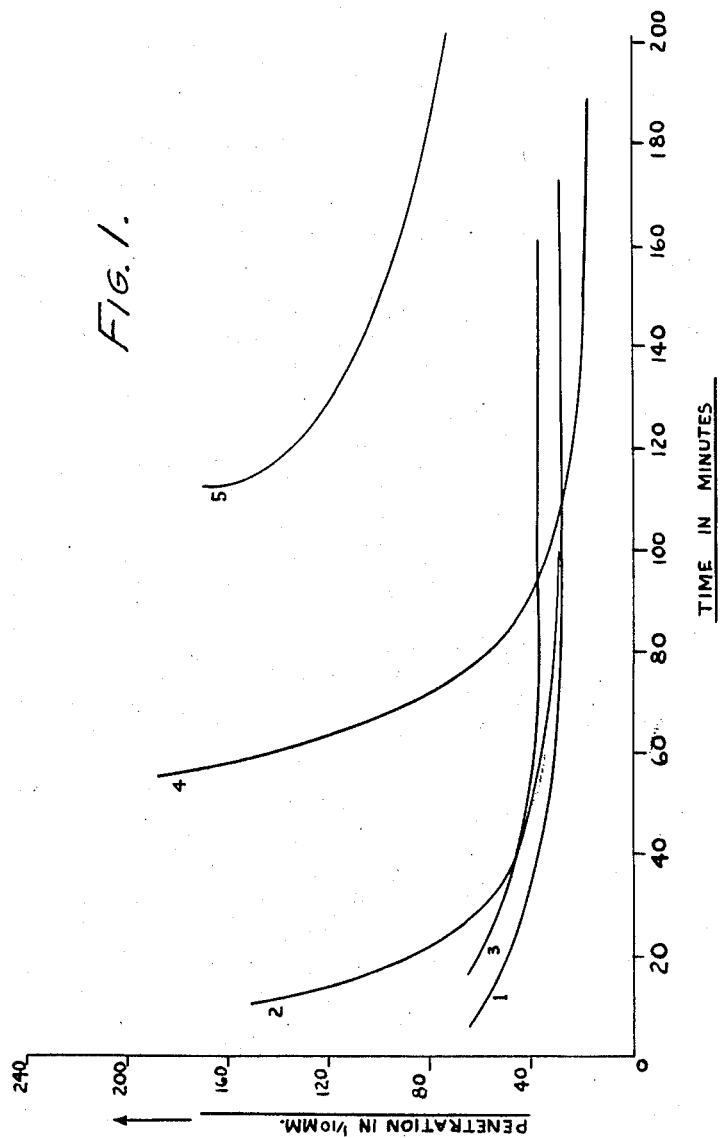
Figure 2:
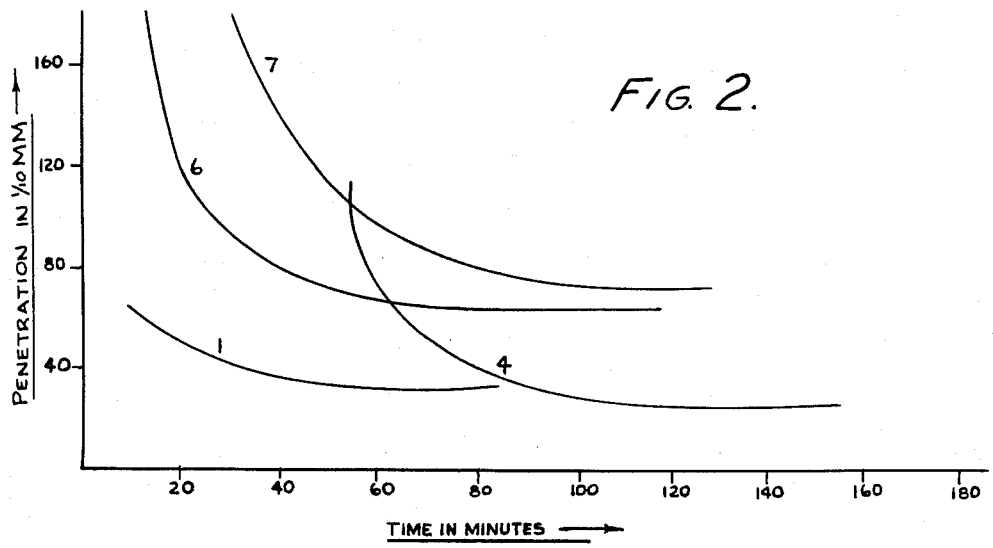
Figure 3:
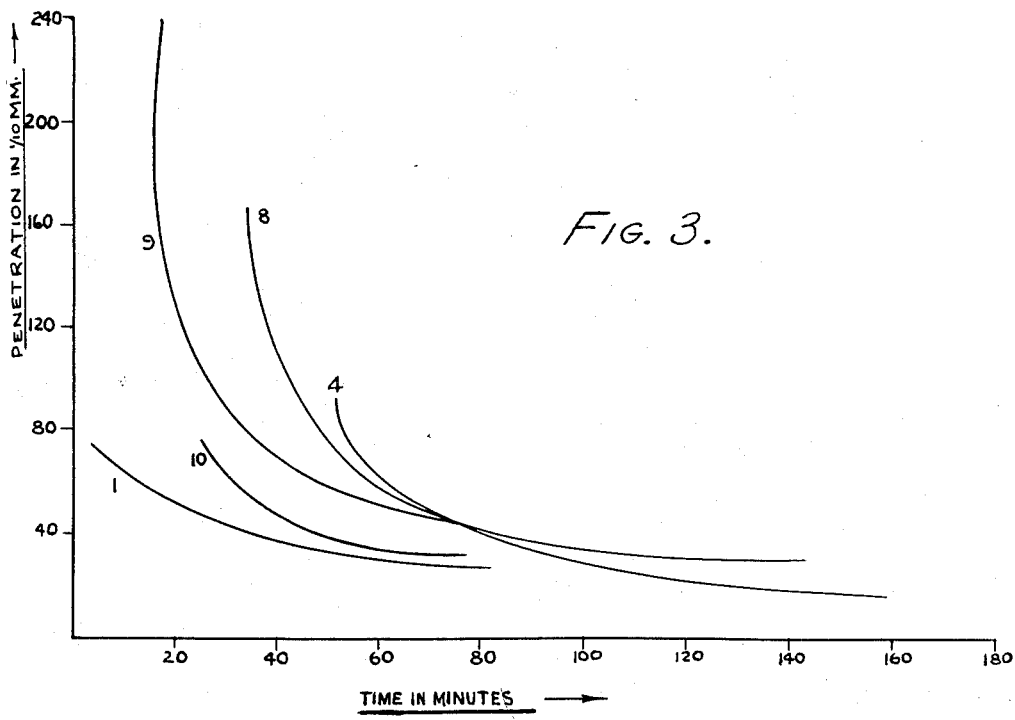
Figure 4:
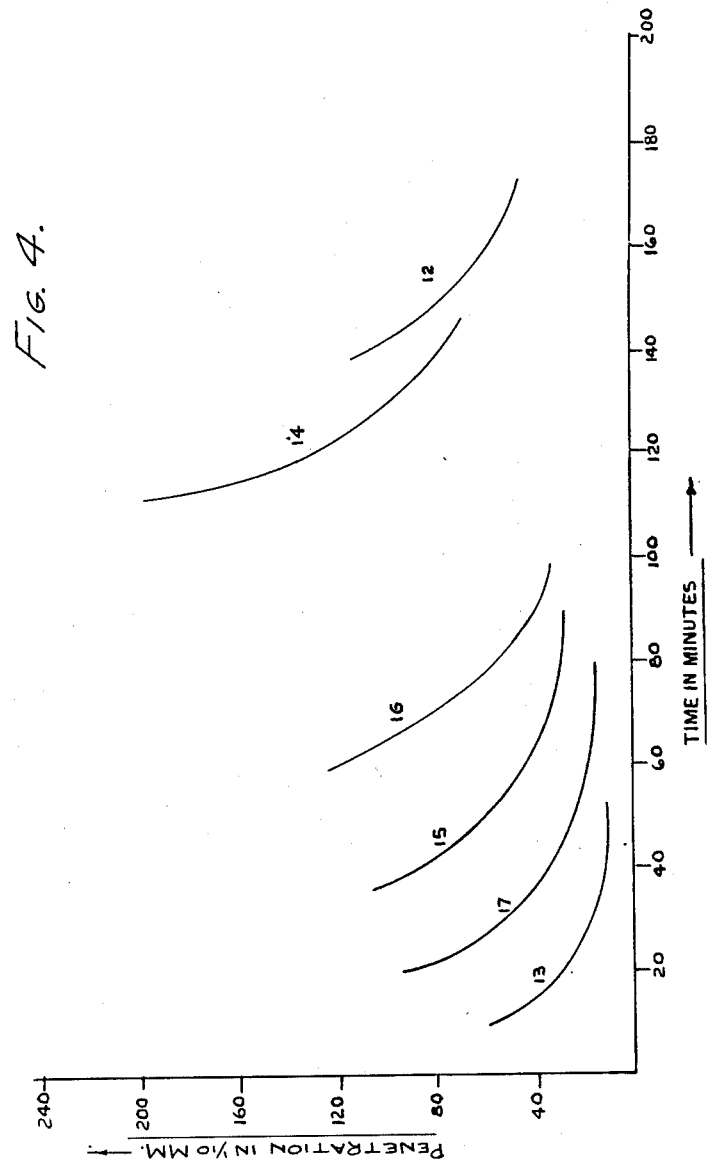

INVENTORS
FREDERICK L. SHEA JR.
HARRY L. HSU
BY Carl F. Peters
ATTORNEY

INVENTORS
FREDERICK L. SHEA JR.
HARRY L. HSU
BY Carl F. Peters
ATTORNEY

United States Patent Office 2,698,256
Patented Dec. 28, 1954

2,698,256

SILICEOUS COMPOSITION AND METHOD FOR MANUFACTURING THE SAME

Frederick L. Shea, Jr., Chicago, and Harry L. Hsu, Evanston, Ill., assignors to Great Lakes Carbon Corporation, Morton Grove, Ill., a corporation of Delaware Application January 12, 1950, Serial No. 138,253

11 Claims. (Cl. 106—308)

This invention relates to the manufacture of light weight siliceous materials. More particularly, the invention relates to a method for chemically converting silica in its various forms to a form which is more reactive chemically and which has properties which render it particularly amenable to the manufacture of light weight heat-insulating materials of high strength.

The manufacture of high temperature heat insulation has been more or less restricted to the utilization of siliceous materials due to the fact that magnesia types of insulation disintegrate rapidly or check severely at temperatures upwards of 1000° F. For this reason, the industry has relied extensively upon the use of various forms of silica which are reacted with binders, for example those of the calcareous type such as lime, Portland cement, shale, etc. The practice of manufacturing such insulation is quite old in the art as evidenced by a patent issued to Brown, U. S. 311,287. The technique of preparing such insulation from diatomaceous earth and calcareous binders has been somewhat improved, the main emphasis being laid upon the preparation of insulatign blocks or slabs of low density and high mechanical strength. These objects have in part been achieved by adding asbestos fiber to the diatomaceous earth-calcareous mixture. It has also been proposed to add certain colloids or dispersing agents to an aqueous slurry of the reactants in order to effect improved stability of the reaction mixture in the period during which the diatomaceous earth reacts with the binder to form a pre-hardened body. It has been possible to produce siliceous insulation blocks or slabs having a density of about 12 to 30 lbs./cu. ft. with a modulus of rupture between about 30 and 150 lbs./sq. in., but this is only achieved by employing highly specialized forms of asbestos fibre.

The preliminary reaction between diatomaceous earth or other siliceous materials and a calcareous binder is usually carried out in such a manner that the reactive mix will not "set up" or harden before the mixture is placed in molds of suitable shape and design. Following the preset or hardening, the resulting siliceous bodies are then heated, usually by means of an autoclave, at temperatures in excess of 100° C. to further accelerate and increase the extent of the reaction between the siliceous material and the binder. It is the usual practice to preliminarily react the siliceous material and binder in the presence of colloids or agents for suspending the reactants for a period of time approximating two hours at temperatures of the order of 80° to 100° C. Following this preliminary reaction whereby the materials set to a pre-determined shape, the aforementioned indurating process is conducted to produce the final product. A desired improvement upon this process would substantially reduce the time required to preliminarily react the siliceous material and binder or accelerate the pre-setting time and which would also reduce the weight of the block without any substantial reduction in strength.

It is an object of this invention to produce a novel, light weight siliceous material which is particularly suitable as high temperature insulating material or in the manufacture thereof.

It is a further object of the invention to provide a novel siliceous material prepared from diatomaceous earth, silica flour, and the like, which material is more suitable as a filter aid, filler, insulating material, catalyst base, and abrasive than the starting material.

It is a further object of the invention to provide an improved light weight siliceous material of increased reactivity with respect to calcareous and other silica-reactive binders and which is adapted to the manufacture of improved calcareous siliceous heat-insulating materials.

It is still a further object of the invention to provide a process for the manufacture of improved siliceous materials from minerals such as diatomaceous earth, silica flour, and other siliceous materials which are reactive with alkaline earth compounds.

It is still a further object of the invention to provide a process for the manufacture of an activated siliceous material from diatomaceous earth, a silica flour, and vesiculated, rhyolitic materials, and the like, which renders said materials highly reactive with alkaline earth silicate-producing compounds.

The above objects as well as others which will become apparent upon a complete understanding of the invention as hereinafter fully described are accomplished by reacting a composition comprising finely divided silica or siliceous material with an alkaline earth silicate-producing compound reactive with said composition, acidifying the resulting product with an acid which will be soluble in water or in the acidic medium employed during acidification while maintaining the pH during the acidification at a value between about 3.0 and about 8.0. The acidification step is then followed by recovering the resulting siliceous product in a manner hereinafter described.

In a broad embodiment of the invention, we react a finely divided silica-containing material of the type more particularly subsequently described herein with an alkaline earth silicate-producing compound, preferably a compound of lime which is reactive with silica and certain other siliceous materials at a temperature and for a time sufficient to cause the formation of hydrous alkaline earth metal silicate upon the exterior surface and in the interstices of the siliceous material. The resulting composition is then acidified with an acid which will react with the hydrous alkaline earth silicate to produce a compound or salt which is soluble either in the acidified mixture or in water or in other suitable solvent. The pH of the reaction mixture is maintained between about 3.0 and about 8.0 during the acidification to insure reaction of the hydrous alkaline earth silicate with the acid agent and to prevent substantial solution of silica. This results in the formation of a siliceous aggregate having in varying amounts a base substantially that of the starting material, and which is further characterized by a reactive silica coating integrally bonded to the surface and interior surfaces of each particle. This renders the aggregate highly reactive, particularly towards calcareous binders of the type employed in the manufacture of siliceous-calcareous high-temperature insulation. Our improved siliceous products are to be distinguished from certain silicic acid-aggregate compositions consisting of silicic acid which has been precipitated from a solution of a water soluble alkali metal silicate by means of a mineral acid in the presence of a mineral aggregate such as rock, shale, diatomaceous earth, etc. Such products are characterized by a loose bonding of the silicic acid to the aggregate and the resulting coating does not form an integral and fixed part of the particle.

The siliceous materials which we employ are preferably of a particle size less than 200 mesh and may consist of siliceous shale, silica flour, crushed siliceous rocks, silicic acids, silica gels, also diatomaceous earth (kieselguhr, infusorial earth) in a crude state or which has been calcined either with or without the use of fluxing agents such as soda ash, sodium chloride, etc. We have also found that artificial or natural pozzolans including calcined shales, volcanic magmas, fly ash, sands, etc. which contain substantial quantities of silica either in an amorphous or colloidal state are useful for the purposes of this invention. Also certain rhyolitic minerals in an expanded state such as vesiculated perlitic minerals, pumic, volcanic ash, etc. have been found to be particularly useful in the preparation of our improved siliceous products. Micaceous minerals such as exfoliated vermiculite are also useful when the reaction is carried out in the presence of an alkali metal compound as hereinafter described.

In conducting the initial reaction to prepare an alkaline earth silicate-siliceous aggregate, we react a silica or siliceous composition of the type above described with sparingly soluble basic compounds such as compounds of alkaline earth metals, either with or without the presence of an alkali metal compound such as sodium hydroxide, potassium hydroxide, sodium carbonate, potassium carbonate, etc. Compounds which have been found to be particularly useful in conducting our process are the oxides and hydroxides of calcium, barium, magnesium, strontium, and the carbonates and bicarbonates of such metals. The amount of alkaline earth metal compound is preferably between about 10 and about 100% by weight based on the weight of siliceous material. When the carbonates and bicarbonates are employed, we have found it to be particularly useful to employ the aforementioned alkali metal compounds which presumably act as catalysts or alkaline earth metal carriers and considerably accelerate the reaction between the alkaline earth metal compound and the siliceous aggregate. When alkali metal compounds are employed, we have found it to be the preferable practice to use about 0.5 to about 10.0% by weight of alkali metal compound based upon the weight of siliceous aggregate.

Following the reaction between the siliceous aggregate and the alkaline earth silicate-producing compound, the resulting reaction product is acidified with an acidic compound which will give a water soluble alkaline earth compound. In other words, the acid will react with the alkaline earth metal silicate present on the surfaces of the siliceous particles to form a compound which will be soluble either in the acidic medium or in a solvent for the resulting alkaline earth metal compounds. For the majority of the alkaline earth metal silicate-siliceous compositions, we have found that acids such as acetic, hydrochloric, sulfurous, and nitric acids and the anhydrides of such acids and mixtures of these materials are particularly suitable. Following acidification, it is the preferable practice to wash the resulting siliceous product until it is substantially free from acid and soluble salts.

The products produced according to our invention have particular utility as an aggregate for high temperature insulation and cements, especially in conjunction with calcareous binders in the manner herein described. Due to the uniformity of the active siliceous surface of the particles, the products are more useful as filteraids than the silica materials from which they were prepared; notable improvements in rate of filtration for a given clarity of filtrate are consistently observed.

Our novel products are adapted to the production of a superior light weight concrete containing Portland cement and pre-determined amounts of our active siliceous compositions. This is due to the fact that these compositions exhibit many times the reactivity of conventional pozzolanic materials such as diatomaceous earth, fly ash, etc. Alternatively, we may prepare a mixture of cement, a siliceous material or aggregate of the type contemplated herein, and an alkaline earth compound which will produce alkaline earth silicates when substantial quantities of water are added to the dry admixture. Such a cement will have better weathering characteristics and strength than those employing conventional possolanic or alkaline absorbing agents and further contribute to the strength of the cement. We may also prepare a mortar comprising essentially a substantially anhydrous mixture of one or more of our improved siliceous products with a calcareous binder, for example lime. Water may be added to this mixture as desired.

We have found that our improved siliceous materials also find utility as a base for catalytic compositions. More particularly, we may impregnate our improved siliceous products with a metal compound, such as by saturation by means of a water solution, followed by drying and heating the resulting impregnated silica at elevated temperatures in either an oxidizing or reducing atmosphere to precipitate metal oxides or metals upon the surface and in the internal structure of the silica particles. Due to the increased porosity of our siliceous materials, a more uniform coating of the metal oxides or metals may be obtained. Such compositions find particular utility in fluidized systems, for example in the catalytic cracking, reforming, alkylation, etc. of hydrocarbons.

In a specific embodiment of the invention, a crude diatomaceous earth having a particle size less than 200 mesh is reacted in an aqueous slurry with a calcium compound such as lime which may be in the form of $Ca(OH)_2$, quick lime, hydrated lime, etc. The amount of lime or other alkaline earth silicate-producing compound is about 10 to about 100% by weight based upon the weight of diatomaceous earth, and preferably 25 to 50% by weight. The slurry of diatomaceous earth and calcium compound is heated with agitation at elevated temperatures, preferably between about 85° C. and the boiling point of the reaction mixture until the reaction is substantially complete. The progress or rate of the reaction can be followed by pH measurements and will be complete when the pH remains constant. Upon acidification of the resulting mixture with an acid, preferably hydrochloric or sulfurous acids, HCl gas, $SO_2$ gas, or mixtures of these materials, while maintaining the pH of the mixture between about 3.0 and about 8.0 and preferably between about 4.0 and about 6.0, a siliceous product is produced which will have a bulk density from 30 to 60% less than that of the starting material, and whose reactivity towards calcareous binders of the type conventionally employed in the manufacture of high-temperature, siliceous insulating material will be greatly improved. Another way of expressing the aforementioned improvement in bulk density is by referring to the "settled volume" of our improved products. This value is determined by suspending the product in water either after drying the same or by suspending the acidified wet product in water. More particularly, we have found that our improved and active diatomaceous earth products have a settled volume of between 5.0 to 11.0 cc. per gram. The lower values are for the materials which have been preliminarily dried at 120° C. prior to measuring the settled volume. As mentioned in our copending application Ser. No. 138,254, filed January 12, 1950, it is desirable to employ the active product directly or in a wet state, i. e., without drying, and reacting it direcly with a calcareous binder. Such "wet" products have a settled volume between 10 and 11 cc. per gram. We have found that a product which has been produced from diatomaceous earth in accordance with our invention will react with a calcareous binder in from one-fourth to one-half the time required when using crude diatomaceous earth. The siliceous product is recovered from the acid mixture by decantation, filtration, or centrifugation or any other suitable method and is preferably washed with water or dilute acid to substantially remove alkaline earth metal salts. In the event that sulfurous acid or $SO_2$ have been employed during the acidification step, it is the preferable practice to wash the product with sulfurous acid having a pH of between about 1.0 and about 4.0 to remove occluded solid alkaline earth metal sulfites since the solubility of these compounds, particularly calcium sulfite, is much greater in sulfurous acid than in water or slightly acid solutions.

We have found that when the pH of the mixture during acidification is controlled between about 3.0 and about 8.0, preferably 4 to 6, there is no danger of losing substantial quantities of silica by solution in the highly acid washing liquid, since the highly active silica is continuously converted to an insoluble form during the acidification.

The siliceous product prepared as described above may be dried at temperatures in excess of 220° C. to remove substantially all of the free water and then used as a siliceous aggregate in the manufacture of high temperature calcareous-siliceous insulation. As described in our copending patent application S. N. 138,254 filed concurrently herewith, we prefer to retain the siliceous product in a wet state and use it directly in the manufacture of the aforesaid heat-insulating material. We have found that the reactivity of the siliceous product in a wet state is considerably improved over that of the material which is dried substantially free of moisture.

To prepare a high temperature insulating material, we admix in aqueous media our improved siliceous aggregate with a calcareous reactant of the type previously described herein. To improve the strength of the final product, we prefer to have present in the mixture a fibrous material which may be organic in nature but which is preferably of mineral origin if the fiber must withstand severe high temperature conditions in subsequent utilization of the final insulating product.

The fibrous material which is added to our improved siliceous product together with a calcareous binder and stabilizing agent if employed, include both organic and mineral type materials. Among the former may be mention lignin, rags, shredded paper and fibers produced from certain vegetable material such as corn stalks, hemp, jute, bagasse, etc. Mineral fibers are preferred when the resulting insulating material is to be subjected to excessive temperatures under which conditions the organic fibers tend to decompose. Fibers such as asbestos, rock wool, glass wool, and the like have been found to be particularly suitable. The fibers are added to the initial siliceous material which is to be reacted with the alkaline earth metal silicate-producing compound and/or are added during the following acidification and prior to the subsequent pre-setting or hardening operation with a calcareous binder. However, the preferred practice is to incorporate the fiber into the desired active siliceous material and admix the resulting composition with the calcareous binder. The fiber is preferably present in an amount between about 5 and about 50% by weight of the aggregate. In many instances, it is preferable to add a small quantity of alkali metal compound such as the hydroxides of sodium or potassium, usually not in excess of 5% by weight of the active siliceous aggregate (dry basis). In addition, we may add an agent of the type hereinafter described which will stabilize or suspend the dried solid products in water to prevent segregation or settling of these materials prior to hardening of the reaction mixture. Since our siliceous materials have greatly improved reactivity with respect to the calcareous binders, we admix the aforementioned ingredients quite rapidly, i. e., in about 2 to 3 minutes, preferably mixing the dry solid reactants together followed by addition of hot water in an amount equal to between about 100 and about 600 parts by weight based on the weight of total solid ingredients. The resulting slurry is then poured into molds or dies of suitable or desired shape and the molded slurry is heated at a temperature in excess of about 85° C. under conditions which will prevent substantial evaporation of the water from the slurry, preferably at 100% relative humidity. When high temperatures, such as between 100° and 150° C. are employed, the pressure must be such that bubble formation is substantially prevented. This is achieved by confining the molds in a closed vessel or by passing water vapor over the surface of the molds during this heating step. The molded slurry will "set up" and harden in from 2 to 30 minutes, depending upon the temperature and pressure conditions and upon the reactivity of the active siliceous aggregate which in turn is dependent upon the material from which it has been produced. Following this hardening step, the resulting product is subjected to an indurating process whereby the calcareous-siliceous body is heated at elevated temperatures and at high humidity to further effect a reaction between the binder and siliceous aggregate. Steam pressures of up to 300 lbs./sq. in., and temperatures between 100° and 230° C. and a reaction time of one to six hours have been found to be useful in effecting this step of the process. If desired, the indurated product is subsequently heated to 120° C. to remove substantially all of the water therefrom.

In a further embodiment of the invention, silica flour (amorphous or crystalline) having a particle size less than 250 mesh is reacted with calcium oxide, the latter being present in an amount between 10 and about 100% by weight based on the silica. An aqueous slurry of the reactants is heated and agitated at the boiling point of the mixture for a period of time between about 1 and about 4 hours. The resulting mixture is then acidified with hydrochloric acid while maintaining the pH of the mixture between about 4.0 and about 8.0. The siliceous product is isolated by filtration and is washed substantially free of calcium chloride by continued washing with water. By means of a penetration test to be hereinafter described, we have found that such a siliceous products reacts with a calcareous binder in about ⅓ to ⅛ the time required to react the original silica flour with such binders. We have found that our active silica flour, when mixed with about 50% by weight of lime, and water in an amount between about 50 and 200 parts by weight of the solid reactants, can be poured into slabs or hollow cylindrical or any other desired shapes and the mixture hardened in about ⅒ the time required for untreated silica flour. The resulting hardened shapes may then be dried and used directly for insulation purposes, or may be autoclaved with steam at temperatures between 100° and 200° C. to effect further hardening and strengthening of the structures. Alternatively, fibers have been incorporated into the active silica flour-calcareous slurry to strengthen the final shape. Asbestos of the Amosite grade or the long-fibered variety is particularly suitable for this purpose.

We have found that we can incorporate certain fillers into our heat insulating materials and this may be done either by having such fillers present during the initial reaction between the siliceous aggregate and the alkaline earth metal silicate-producing compound or by adding the aggregate to the active siliceous product produced by acidification. Fillers which have been found to be useful are whiting, diatomaceous earth which may be either natural or calcined, silica flour, clays, and various shales and sands in a natural or calcined state, pumice, expanded or vesiculated rhyolitic minerals, exfoliated vermiculite, etc. The fillers will preferably comprise the minor portion of the total solids or siliceous aggregate which is to be reacted with a calcareous binder.

In forming the high-temperature insulating blocks by reacting a slurry of our improved siliceous aggregate with a calcareous binder with or without the addition of fibers, we may employ stabilizing agents such as bentonite, montmorillonite, attapulgite, alum, and the like. This practice permits greater quantities of water to be used in making the siliceous-calcareous slurries and results in pre-hardened shapes of lower density. In many instances we are able to dispense with the use of such agents due to the increased bulk volume of our active siliceous materials as compared to the untreated or conventional aggregates.

It is also within the scope of our invention to prepare water-repellant calcareous-siliceous compositions by incorporating in the slurry which is to be "pre-set" or hardened certain water repellant compositions such as red oil, casein, aluminum sulfate, asphalt and tar emulsions, etc. Alternatively, we may coat the pre-set or indurated slabs or sheets with organic or inorganic coating materials including water-proof paper, fiber board, metal sheeting, for example copper, aluminum and steel, or with water-proof plywood. If it is desired to color the blocks, various substances can be added to the siliceous-calcareous mixture. Examples of such substances are the oxides of iron, manganese, cobalt, and other metals, also graphite, amorphous carbon, etc. In certain cases it will be desirable to color the face or surfaces of the final product, and this may be accomplished by impregnation with a suspension of white lead, barium sulfate, zinc sulfate or other pigments including iron oxide, and the various organic ultra marines, basic and acidic dyes. Additional methods for accomplishing this feature will occur to those skilled in the art.

We have also found that we can incorporate adhesives and cements into our novel siliceous compositions, thereby either forming a loose aggregate which resists settling or segregation when used as loose-fill insulation or which can be consolidated to form rigid siliceous shapes which are useful in high-temperature insulation. For example, we may add Portland cement, magnesium oxychloride, magnesium oxysulfate, or water glass and the like to our light weight siliceous materials and depending upon the end use the resulting product may be formed either by molding or extrusion into desired shapes. Alternatively, we may, if desired, employ organic binders or adhesives such as tars and pitches of bituminous or petroleum origin, particularly asphalt emulsions employing between about 2 and about 25% by weight of asphalt (on a solid basis) based upon the weight of siliceous material. When such a composition is formed and dried to remove the water from the emulsion, there results a rigid, strong, shaped siliceous body which is water-repellant and which is highly useful as insulating material under humid conditions.

In many applications it is desirable to employ a finely divided aggregate as a filler or extender for plastic compositions, for example in natural or synthetic rubber formulation and in synthetic plastic materials of the polyvinylchloride, phenol-formaldehyde and urea-formaldehyde type. In such cases it is preferable that the surface of the aggregate be hydrophobic in character in order that the rubber or plastic material may wet the particles. We have found it to be useful to employ certain agents which are usually insoluble in water, for example metallic stearates such as magnesium, aluminum and sodium stearate, natural and synthetic waxes, fatty acids and similar agents.

It is also within the scope of our invention to produce highly purified active siliceous compositions by any of several methods involving the preliminary separation of impurities from diatomaceous earth, silica flour or other siliceous materials as for example by air or wet classification, which may be followed by the reaction with an alkaline earth metal silicate-producing compound. The density of calcium silicate approximates 3.0 grams per cc. whereas the impurities found in diatomaceous earth as well as in other impure silica materials will average between about 1.8 and about 2.7 grams per cc. By reacting the siliceous composition with an alkaline earth silicate-producing compound, we may effectively increase the density of the silica fraction. The impurities which do not react may then be removed by wet classification methods or the calcium silicate coated silica may be removed by air classifying the dry reaction product. The purified calcium silicate coated material is then acidified according to procedures described herein to produce an active silica in a high state of purity. Such materials have been found to be useful as filteraids for solutions of pharmaceutical compounds wherein it is desired to maintain such solution free from extraneous impurities.

In order to more fully illustrate the nature and character of the invention but with no intention of being limited thereby, we particularly set forth the following:

In Examples 1 to 5, 100 parts by weight of diatomaceous earth, 90% of which was −250 mesh, were reacted with 50 parts by weight of lime having a purity of about 95% in sufficient water to form a slurry of low viscosity. The mixture was boiled with vigorous agitation for about four hours. Following this, the supernatant liquid was decanted and the product divided into three parts, each of which was acidified with hydrochloric acid until the pH value of the mixture reached a pre-determined point. Each sample was filtered and washed with water to substantially remove soluble salts and excess acid. Several samples were then dried in an oven at 120° C. for eight hours and ground to pass a 250 mesh screen. A portion of the material produced by aciidfication to a pH of 5 was not dried (Example No. 1) in order that the reactivity of such a product with respect to a calcareous binder could be compared to the dried product. The reactivity of the resulting active siliceous product towards a calcareous binder was tested by admixing the products with 50% by weight of lime and adding to the resulting mixture a pre-determined amount of water so regulated that the various mixtures had substantially the same viscosity (constant consistency). The slurry was heated to a temperature of about 85° C. within two minutes with vigorous agitation and the mixture poured into a mold which was maintained at the aforesaid temperature. To measure the rapidity of "pre-set" or hardening of the mixture, penetration tests were made at regular intervals by means of a penetrometer. The instrument employed was one obtained from the Precision Scientific Company with a standard 1 mm. conical tipped needle to which was applied a 150 gram load. The needle was adjusted so that it barely touched the surface of the block. Readings on the penetrometer were taken until a ocnstant penetration of about 4 mm. was obtained.

Figure I of the drawings graphically illustrates the effect of conditioning the diatomaceous product in accordance with the present invention, the curves being numbered to correspond with the examples as set forth in Table I below. Example No. 4 is untreated diatomaceous earth.

TABLE I

Comparison of treated and untreated diatomaceous earth

| Example No. | Percent Water Content of Slurry for Constant Consistency | Bulk Density, gm./cc., −250 mesh, dry | Slurry Density, gm./cc. (based on same consistency) | Cake Density, #/ft.³ (Block Dried at 120° C.) | Neutralization pH |
|---|---|---|---|---|---|
| 1 | 483 |  | 1.09 | 13.1 | 5 |
| 2 | 425 | .099 | 1.06 | 13.0 | 7 |
| 3 | 430 | .098 | 1.07 | 13.2 | 5 |
| 4 | 300 | .155 | 1.08 | 19.9 |  |
| 5 | 307 | .144 | 1.06 | 18.9 | 9 |

Based on the penetration figures, the pre-set time of diatomaceous earth with 50% lime and acidified with hydrochloric acid to pH 5 to 7 is ⅓ to ⅛ of that necessary when employing untreated diatomaceous earth. Furthermore, it will be seen that diatomaceous earth activated by treating with lime in accordance with the present invention and acidified with hydrochloric acid exhibits apparent bulk densities up to 50% lower than that of the untreated material.

In the following examples, employing the operations and the diatomaceous earth illustrated in Examples 1 to 5, the diatomaceous earth was reacted with 30% by weight of lime and acidified with hydrochloric acid to a pre-determined pH value. For basis of comparison, untreated diatomaceous earth (Example No. 4) and diatomaceous earth treated with 50% lime and acidified with hydrochloric acid to a pH of 5 (Example No. 1) are also illustrated. The reactivity of the active siliceous product as measured by penetration tests is graphically illustrated in Figure II of the drawings and the data including cake density of the hardened or "set" blocks are set forth in the following table:

TABLE II

| Example No. | Percent Water content of Slurry for constant consistency | Cake Density, #/ft.³ (block dried at 120° C.) | Neutralization pH |
|---|---|---|---|
| 6 | 489 | 13.6 | 5 |
| 7 | 493 | 13.8 | 3 |
| 4 | 300 | 19.9 |  |
| 1 | 483 | 13.1 | 5 |

It will be seen that reacting diatomaceous earth with 30% by weight of lime based on the weight of diatomaceous earth and acidification with hydrochloric acid produces a siliceous material slightly less reactive than when using 50% lime. Based on the penetration tests, the pre-set time of diatomaceous earth activated with 30% lime when acidified with hydrochloric acid is ⅓ of that required when employing the crude diatomaceous earth.

In the following examples, an active diatomaceous earth produced in accordance with the process described for Example I was admixed with pre-determined amounts of the untreated diatomaceous earth. This mixture was reacted in an aqueous slurry with 40% by weight of lime and penetration tests were conducted as previously described. Example No. 4, untreated diatomaceous earth, is reproduced for purposes of comparison. The results are graphically illustrated in Figure III of the drawings, and in part in the table set forth below:

TABLE III

| Example No. | Percent Water content of slurry for constant consistency | Cake density, #/ft.³ (block dried at 120° C.) | Percent Treated diatomaceous earth |
|---|---|---|---|
| 1 | 483 | 13.1 | 100 |
| 8 | 346 | 19.4 | 25 |
| 9 | 405 | 18.2 | 50 |
| 10 | 476 | 15.7 | 75 |
| 4 | 300 | 19.9 | 0 |

It will be seen that the pre-set time required for the lime-siliceous product containing 100% conditioned diatomaceous earth is about ⅓ that required when a mixture comprising 75% conditioned diatomaceous and 25% untreated diatomaceous earth is used. Reducing the quantity of conditioned diatomaceous earth to 50% and 25% correspondingly increases the time required to set the siliceous-calcareous mixture.

*Example No. 11*

One hundred grams of an impure diatomaceous earth comprising the over-burden from a mining operation, and which contains 65% $SiO_2$, was activated by heating a slurry of this material with 50% by weight of lime, based on the impure diatomaceous earth, followed by acidification of the resulting mixture with hydrochloric acid to a pH of about 5.0. By penetration tests conducted as described above, it was determined that the resulting siliceous material is 200% more reactive with respect to calcareous binders than the original starting material.

Our invention, therefore, makes available to the industry a considerable quantity of impure diatomaceous earth which heretofore has been discarded but which can now be utilized in the manufacture of high temperature calcareous-siliceous insulation.

One hundred gram samples of amorphous silica flour (325 mesh and bulk density 0.551 gram per cc.), and expanded perlite having a bulk density of 0.066 grams per cc. before grinding and a bulk density of 0.158 grams per cc. after grinding and sieving through a 250 mesh screen were used in the following preparations: A sample of each type of material was heated in an aqueous slurry with 50% by weight of lime and 0.5% by weight of sodium hydroxide based on the weight of siliceous material, the heating being conducted for 4 hours at 20 lbs./sq. in. steam pressure. The resulting material was acidified with hydrochloric acid to a pH of 6, filtered, washed with water, and dried at 110° C. The reactive materials were mixed with bentonite, lime, sodium hydroxide and asbestos in the following propotions: siliceous material 53%, bentonite 2%, lime 34.5%, sodium hydroxide 0.5%, Amosite asbestos 10%. The reactivity of the siliceous materials as indicated by the penetration test (50 gram load) is set forth in Figure IV of the drawings and in the Table IV below. Examples 12, 14 and 16 employ untreated siliceous material and Examples 13, 15, and 17 employ activated materials produced from silica flour, expanded perlite and ground expanded perlite, respectively, according to our invention.

TABLE IV

| Example No. | Siliceous Material | Percent Water Content of Slurry at Constant Consistency | Cake Density, #/ft.³ (block dried at 110° C.) | Pre-set time (Minutes) | Modulus of Rupture, lbs./in.² after autoclaving at 125 p. s. i. |
|---|---|---|---|---|---|
| 12 | silica flour | 200 | 41.1 | 155–165 | 236 |
| 13 | 12 (treated) | 200 | 28.1 | 10–12 | 205 |
| 14 | expanded perlite | 467 | 15.1 | 130–155 | 24.2 |
| 15 | 14 (treated) | 337 | 14.0 | 40–55 | 27.1 |
| 16 | expanded perlite (ground) | 250 | 25.5 | 80–90 | 75.9 |
| 17 | 16 (treated) | 250 | 25.0 | 25–35 | 43.2 |

*Example No. 18*

Fifty grams of diatomaceous earth of the type employed in Examples 1 to 5 were heated in an aqueous slurry with 50 grams of magnesium oxide at the boiling point of the resulting mixture. The magnesium silicate coated diatomaceous earth was acidified with hydrochloric acid to a pH of about 6.0. The resulting conditioned siliceous product recovered in nearly 100% yield, was found to react with calcium oxide to form a preset product, the time required being about ½ of that required when employing untreated diatomaceous earth and magnesium oxide.

In the following examples, silica sand was ground so that about 90% would pass a 325 mesh screen. One hundred gram samples of the screened material were reacted with 50% by weight of lime in an aqueous slurry with sufficient water to provide a reaction mixture of fairly low viscosity. In order to accelerate the reaction, a small quantity of sodium hydroxide (in amounts as indicated in Table V) was added. The resulting mixtures were boiled for a period of four hours and then acidified with hydrochloric acid to a pH of about 6.0. The resulting siliceous product was dried at 100° C. and its reactivity towards calcareous binders was tested in the following manner.

Seventy parts of each of the treated silica materials were admixed with 45 parts of lime, 13 parts of asbestos, 2.6 parts of bentonite, 0.6 part of sodium hydroxide (based on the weight of active silica). To the resulting mixture was added a sufficient amount of water to provide equal consistencies for the mixture. The resulting slurries were rapidly heated to 85° C. and maintained substantially in this temperature during the setting period.

The data in the following table indicate that the silica sand treated with lime in conjunction with a small quantity of alkali metal compound reacts with lime as a binder in ¼ to ⅙ the time required to react the starting silica material. In the following table, Example 19 is untreated silica sand.

TABLE V

| Example No. | Percent NaOH | Percent H₂O | Bulk Density, #/ft.³ | Cake Density, #/ft.³ (dried at 120° C.) | Setting time (minutes) |
|---|---|---|---|---|---|
| 19 | | 200 | 50 | 32.3 | 210 |
| 20 | 5 | 200 | 40 | 27.8 | 53 |
| 21 | 10 | 200 | 35 | 29.9 | 25 |

In some instances, it has been found to be advantageous to mix various types of siliceous materials either prior to the initial reaction with an alkaline earth or amphoteric metal compound to condition the siliceous material, or alternatively, to add different types of conditioned siliceous material to a calcareous binder to form a pre-set, high-temperature insulating material. It is also useful to prepare mixtures of conditioned siliceous material and certain untreated siliceous or silica-containing aggregates to provide insulating blocks of predetermined density and strength.

While the above examples illustrate the use of various forms of finely divided silica in a reaction with lime or magnesium oxide, it is to be understood that the process may be conducted with alkaline earth metal-producing compounds of the type previously mentioned herein, and this may or may not be accomplished by the use of alkali metal promoters.

Having thus fully described the nature and character of our invention, we claim:

1. A process for greatly increasing the surface area and reactivity to lime of diatomaceous earth which comprises heating with agitation an aqueous slurry of finely divided diatomaceous earth particles with from 10 to 100 parts by weight, based upon said earth, of reagent taken from the group consisting of the oxides, hydroxides, carbonates and bicarbonates of an alkaline earth metal to produce a coating of alkaline earth metal silicate upon the exterior surfaces and interstices of the diatomaceous earth particles, acidifying the resulting product with sufficient hydrochloric acid to solubilize substantially all of the alkaline earth metal and leave a reactive silica coating integrally bonded on said particles while maintaining the pH between about 3.0 to about 8.0 during acidification, washing the resulting silica product to remove excess acid and soluble salts and recovering the resulting solid reactive silica product.

2. A process for greatly increasing the surface area and reactivity to lime of siliceous material taken from the group consisting of siliceous shales and rocks, silica sand, silica flour, diatomaceous earth, artificial and natural pozzolans, and expanded rhyolitic and micaeous minerals which comprises heating with agitation an aqueous slurry of finely divided particles of said siliceous materials with from 10 to 100 parts by weight, based upon said siliceous material, of reagent taken from the group consisting of the oxides, hydroxides, carbonates and bicarbonates of an alkaline earth metal to produce a coating of alkaline earth metal silicate upon the exterior surfaces and interstices of the siliceous particles, acidifying the resulting product with sufficient hydrochloric acid to solubilize substantially all of the alkaline earth metal and leave a reactive silica coating integrally bonded on said particles while maintaining the pH between about 3.0 to about 8.0 during acidification, washing the resulting silica product to remove excess acid and soluble salts and recovering the resulting solid reactive silica product.

3. A process for greatly increasing the surface area and reactivity to lime of finely divided silica particles which comprises acidifying a composition comprising finely divided silica which has been heated with agitation in an aqueous slurry with from 10 to 100 parts by weight, based upon said silica, of reagent taken from the group consisting of the oxides, hydroxides, carbonates and bicarbonates of an alkaline earth metal to produce a coating of alkaline earth metal silicate upon the exterior surfaces of the silica particles, said acidification being effected with sufficient acid taken from the group consisting of hydrochloric, nitric, sulfurous and acetic acids and their anhydrides to solubilize substantially all of the alkaline earth metal and leave a reactive silica coating integrally bonded on said particles while maintaining the pH between about 3.0 to about 8.0 during acidification, washing the resulting silica product to remove excess acid and soluble salts and recovering the resulting solid reactive silica product.

4. A product having a high reactivity to lime consisting essentially of a fine particled material having a base of diatomaceous earth which is integrally coated with amorphous silica, said product having a bulk density of from 30 to 60% less than that of the base diatomaceous earth and having a settled volume of between 5.0 to 11.00 cc. per gram.

5. A product having a high reactivity to lime consisting essentially of a fine particled material having a base taken from the group consisting of silica flour and ground silica sand which is integrally coated with amorphous silica, said product having 4 to 6 times the reactivity to lime as compared with the initial silica material.

6. A process for greatly increasing the surface area and reactively to lime of silica flour which comprises heating with agitation an aqueous slurry of essentially −200 mesh silica flour with from 10 to 100 parts by weight, based upon said flour, of reagent taken from the group consisting of the oxides, hydroxides, carbonates and bicarbonates of an alkaline earth metal to produce a coating of alkaline earth metal silicate upon the exterior surfaces and interstices of the silica flour particles, acidifying the resulting product with sufficient hydrochloric acid to solubilize substantially all of the alkaline earth metal and leave a reactive silica coating integrally bonded on said particles while maintaining the pH between about 3.0 to about 8.0 during acidification, washing the resulting silica product to remove excess acid and soluble salts and recovering the resulting solid reactive silica product.

7. A process for greatly increasing the surface area and reactively to lime of diatomaceous earth which comprises heating with agitation an aqueous slurry of finely divided diatomaceous earth particles with from 10 to 100 parts by weight, based upon said earth, of reagent taken from the group consisting of the oxides, hydroxides, carbonates and bicarbonates of an alkaline earth metal to produce a coating of alkaline earth metal silicate upon the exterior surfaces and interstices of the diatomaceous earth particles, acidifying the resulting product with sulfurous acid to produce alkaline earth metal sulfite and leave a reactive silica coating integrally bonded on said particles while maintaining the pH between about 3.0 to about 8.0 during acidification and washing the resulting product with sulfurous acid having a pH between about 1.0 and about 4.0 to remove residual alkaline earth metal sulfite from the reactive silica product.

8. A process for producing a reactive silica product which comprises heating with agitation an aqueous slurry of essentially −200 mesh silica flour with from 10 to 100 parts by weight of lime, based upon said silica flour, to produce a coating of calcium silicate upon the exterior surfaces and interstices of the silica flour particles, acidifying the resulting product with sulfurous acid while maintaining a pH between about 4.0 and about 8.0 during acidification thereby producing calcium sulfite and leaving a reactive silica coating integrally bonded on said particles, washing the resulting product with a solvent for calcium sulfite and which is substantially inert to silica, and recovering the resulting solid reactive silica product.

9. A process for greatly increasing the surface area and reactivity to lime of silica sand which comprises heating with agitation an aqueous slurry of essentially −325 mesh silica sand with from 10 to 100 parts by weight, based upon said sand, of reagent taken from the group consisting of the oxides, hydroxides, carbonates and bicarbonates of an alkaline earth metal in the presence of between about 0.1 and about 10% by weight of alkali metal hydroxide, to produce a coating of alkaline earth metal silicate upon the exterior surfaces and interstices of the silica sand particles, acidifying the resulting product with sufficient acid taken from the group consisting of hydrochloric, nitric, acetic and sulfurous acids and their anhydrides to solubilize substantially all of the alkaline earth metal and leave a reactive silica coating integrally bonded on said particles while maintaining the pH between about 3.0 to about 8.0 during acidification, washing the resulting silica product to remove excess acid and soluble salts and recovering the resulting solid reactive silica product.

10. A process according to claim 9 wherein the reagent employed to produce the alkaline earth metal silicate-coated sand particles is lime and the acid is sulfurous acid.

11. A process according to claim 9 wherein the reagent employed to produce the alkaline earth metal silicate-coated silica sand particles is lime and the acid is hydrochloric acid.

References Cited in the file of this patent

UNITED STATES PATENTS

| Number | Name | Date |
|---|---|---|
| 685,094 | Bowie | Oct. 22, 1901 |
| 1,060,614 | McCarty | May 6, 1913 |
| 1,590,132 | Teitsworth | June 22, 1926 |
| 1,798,766 | Stoewener | Mar. 31, 1931 |
| 1,874,186 | Guertler | Aug. 30, 1932 |
| 1,945,534 | Rembert | Feb. 6, 1934 |
| 2,062,879 | Hammenecker | Dec. 1, 1936 |
| 2,215,891 | Thomson et al. | Sept. 24, 1940 |
| 2,249,767 | Kistler | July 22, 1941 |
| 2,258,787 | Melaven et al. | Oct. 14, 1941 |

FOREIGN PATENTS

| Number | Country | Date |
|---|---|---|
| 1,769 of 1898 | Great Britain | May 14, 1898 |
| 375,144 | Great Britain | June 23, 1932 |